April 7, 1942.  P. STADTLER  2,278,903
SPRING MOUNTING
Filed March 7, 1939
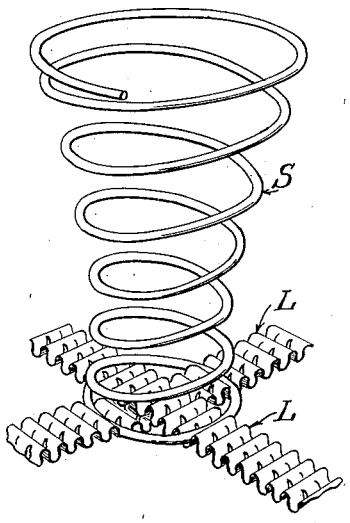
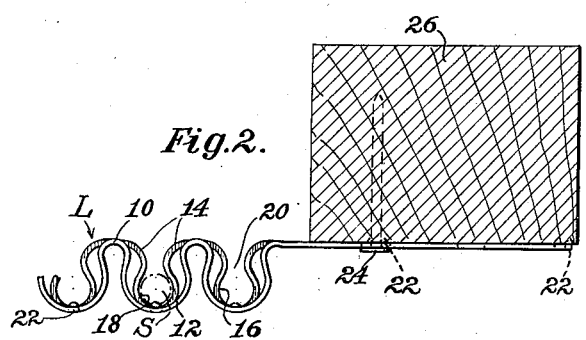
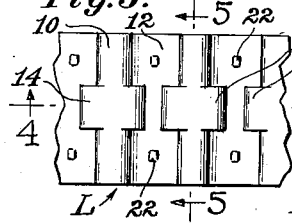
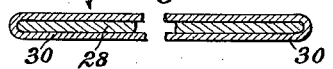
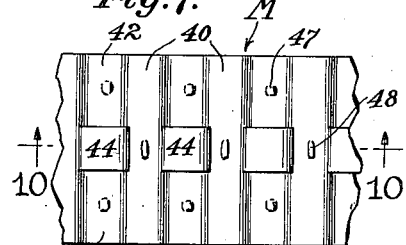
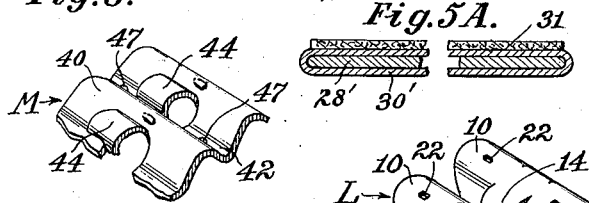
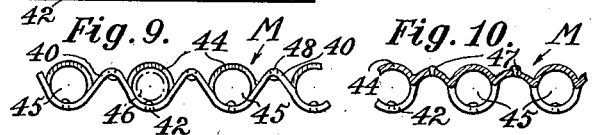
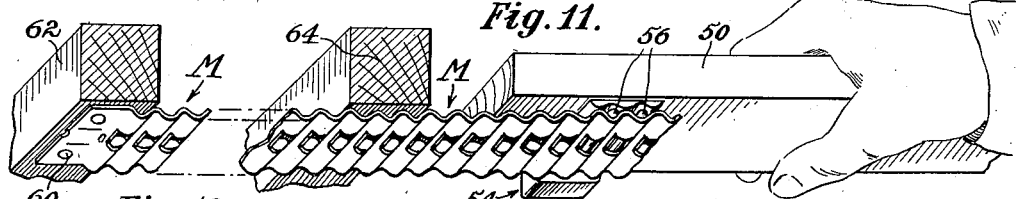
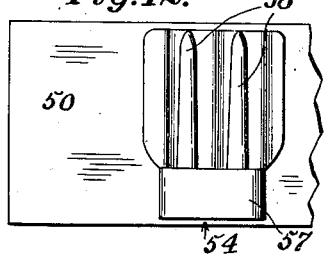
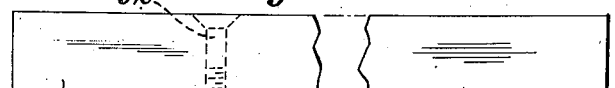
INVENTOR.
Paul Stadtler.
ATTORNEYS.

Patented Apr. 7, 1942

2,278,903

UNITED STATES PATENT OFFICE 2,278,903

SPRING MOUNTING

Paul Stadtler, Flushing, N. Y.

Application March 7, 1939, Serial No. 260,299

9 Claims. (Cl. 5—264)

This invention relates generally to a support and a mounting for coil springs such as are used in furniture for spring cushions, box springs and the like. More particularly it relates to lacing strips which serve for the support of such coil springs.

Coordinately therewith it relates to a tool by the aid of which such lacing strips may be effectively and conveniently applied.

Among the general objects of my invention is the provision of a lacing strip that will perform its supporting function in a highly effective manner, and one that is readily installed and on which springs may be quickly and conveniently mounted in the desired position, whereby a great saving in the time of assembly is effected. Among the general objects of my invention is further the provision of a lacing strip that is economical in manufacturing cost.

More specifically the objects of my invention include the provision of a lacing strip that is resilient, whereby it will have a cushioning effect that is added to that of the springs, and one that is extensible in a longitudinal direction and is provided with seats forming an integral part thereof and adapted to receive portions of the springs, and which seats are on the strip and are so positioned that they can accommodate any of the springs in common use.

Among the more particular objects of my invention is further the provision in a lacing strip of a seat for a spring portion that is integral with the strip and will hold the spring against disengagement from the strip in an upward as well as in a downward direction and laterally, the provision in a lacing strip of seats integral therewith and serving to effect an interlocking against relative movement of a pair of such strips crossing each other when a spring is mounted thereon, and the provision of a lacing strip on which a spring may be mounted without the use of tools or additional parts.

Among the more particular objects of my invention is also the provision of a lacing strip construction whereby sounds caused by movement of the springs relatively to the strips are deadened.

These objects and such other objects as will hereinafter appear or be pointed out are attained in the illustrative embodiments of my invention shown in the drawing in which:

Figure 1 is a view in perspective showing the application of my invention to the support of coil springs;

Figure 2 is a side view, on an enlarged scale, of a lacing strip such as shown in Figure 1 and also illustrates the manner of attaching an end of the lacing strip to a frame member of a spring cushion or the like;

Figure 3 is a fragmentary plan view of the lacing strip of Figure 2;

Figure 4 is a section on the line 4—4 of Figure 3 looking in the direction of the arrows;

Figure 5 is a fragmentary sectional view on a greatly enlarged scale of a portion of the lacing strip of Figure 3, this view being taken substantially on the line 5—5 of Figure 3;

Figure 5a is a view similar to Figure 5 showing a sound deadening layer applied to the lacing strip;

Figure 6 is a fragmentary perspective view of a portion of the lacing strip of Figure 2;

Figure 7 is a fragmentary plan view of another embodiment of my invention;

Figure 8 is a fragmentary perspective view thereof;

Figure 9 is a fragmentary side view thereof;

Figure 10 is a fragmentary transverse section substantially on the line 10—10 of Figure 7 looking in the direction of the arrows;

Figure 11 is a perspective view showing the manner of stretching the lacing strip when applying it to the frame of a spring cushion or the like by means of my improved stretching tool;

Figure 12 is a bottom plan view of one end of my improved stretching tool; and

Figure 13 is a side elevational view of my improved stretching tool.

Before entering upon a detailed description of my invention I will premise that it has long been customary to construct spring cushions and the like with outer frames within which are supported the pad constituting the upper part of the cushion. The springs rest on supports secured to the frame. One type of support for this purpose, and it is this type to which my invention belongs, is constituted by bands or strips of material, called lacing strips, arranged so as to cross each other and thereby form a network, and each of the aforementioned springs is positioned at the intersection of a pair of these bands.

In Figure 1 I have shown a coil spring such as customarily used in furniture at S and this coil spring is shown as supported on a pair of lacing strips L of my improved construction, the details of which are more fully disclosed in Figures 2 to 6. It will be observed that each strip is corrugated transversely so that its surface is constituted by alternating hills and valleys. It will further be observed that the spring S is supported at four points thereof and that these points of support are in the valleys of the strips L. The exact manner of support will be described hereinafter.

By referring particularly to Figure 2 which is a side view and Figure 6 which is a perspective view, it will be observed that the lacing strips L may be described as of undulating contour having relatively narrow ridge portions 10 with relatively wide valley portions 12 therebetween. Struck up laterally from the mid-portions of the sides of the lacing strip lying intermediate the valleys and the ridges are bands 14 contoured at their lower portions so as to provide a substantially cylindrical seat 16 adapted to receive a section 18 of the spring S, this section being indicated in dotted lines in Figure 2. The cylindrical seat referred to is only partially cylindrical being open at the top, as indicated at 20, this opening however being of restricted width by making the bands 14 overhang so that if the portion 18 of the spring is of the relative diameter shown, it can only be introduced into the seat 16 by separating the bands 14 such as by flexing them about the bottom of the valley portion 12 thereby causing the bands 14 to separate. When the lacing strip reassumes its normal contour as in Figure 2, after flexing as described, the portion 18 will be held against vertical upward displacement as well as against downward displacement and also lateral horizontal displacement.

Perforations 22 are provided in the valley portions and through these perforations may be driven nails such as the nail 24 (see Figure 2) whereby the end of the lacing strip may be supported from the frame 26 of a spring cushion, seat or the like.

The advantages of my improved construction will now be apparent. The lacing strips may be applied to a spring cushion frame or the like (such as the frame 26 of Figure 2), by having their ends fastened thereto and at the crossing point of each pair of strips a spring may be placed as shown in Figure 1. In placing the spring it is merely necessary to select the desired valleys into which the spring is to be inserted and then to cause it to enter the seat 16 therein by suitable deformation of the strip and downward pressure on the spring.

Figure 5 represents on an enlarged scale a section taken transversely through the lacing strip L and illustrates a construction that I have found of great utility for the purpose of deadening the sounds that are produced by relative movement between the spring S and the lacing strip L, which sounds are very annoying. In said figure the numeral 28 designates the steel strip constituting the foundation of the lacing strip L and this is shown as coated on both sides thereof with sound deadening material 30. Such coating may consist of sheeted material such as thick paper secured to the strip by mastic which will adhere to the steel. I prefer to apply this coating to the unformed steel strip and then subject the same to the forming operations.

In Figure 5a I have shown a modified construction in which a strip of felt 31 is suitably secured to the sound deadening material 30', which, as before, surrounds and is secured to the steel strip 28'. The felt acts as an additional sound deadening means.

At 22 I have shown perforations punched through the steel; these are shown as of restricted size and as not penetrating the paper pulp coating on the upper side, this coating being raised into a bump as clearly appears in the drawing. It will be understood that when a nail is driven through the strip the perforation is enlarged by the nail. The perforations 22 are shown as positioned in the bottoms of the valleys 16, in which position they are convenient for insertion of nails such as the nail 24 in Figure 2 which is driven through a perforation 22 into the frame member 26.

In commercial practice I have found it convenient to manufacture the strips in 27 yard rolls and the material employed is cold rolled steel .018 inch thick and 1⅛ inches wide. The spacing of the valleys of the lacing strip may be about one half an inch and their depth about $\frac{5}{16}$ of an inch. The greatest thickness of coil spring wire that may be inserted is approximately $\frac{3}{32}$ of an inch. When the strips are so dimensioned they may be employed with all types of springs ordinarily used. The springs vary as to the diameter, the number of coils, the height of the coils and the spacing of the springs according to the size of the furniture and the quality of the product. My improved lacing strips will take care of all these varying characteristics. It will be understood of course that for particular purposes dimensions other than those indicated may be found preferable.

A second embodiment of my invention is disclosed in Figures 7 to 12 inclusive. In these figures a lacing strip M is shown as comprising ridge portions 40 and valley portions 42 and struck upward from the inner parts of the bottoms of the valley portions at the middle of the strips are bands 44. The bands and the remaining portions of the bottoms of the valleys 42 are so contoured as to define a cylindrical passageway 45 into which a portion 46 of the coil spring S indicated in dot and dash lines may be inserted by endwise movement thereof through the passage.

At 47 I have shown perforations similar to the perforations 22 of the first embodiment and adapted for the insertion of nails. At 48 I have shown other perforations formed at the mid-portions of the ridges 49, and between the bands 44. These perforations also may be used for driving nails through and are moreover very convenient to determine a line of cleavage when severing the lacing into strips.

In seating the coil spring S on a pair of such lacing strips it will obviously be necessary to introduce the spring into the cylindrical passages by rotation thereof about its axis and the end portion of the spring must be introduced into its seat in each strip successively.

While the necessity for this rotational introduction of the spring into the lacing strips is disadvantageous as compared with the seating of the spring by lateral movement against the strip as in the first embodiment, it has the advantage that once the spring is in place it is positively secured against upward movement whereas in the first embodiment there is always the possibility of disengagement of the spring from its seat due to deformation of the lacing strip. Furthermore whereas the locking effect in the first embodiment is dependent on the diameter of the wire of which the spring is made, no such dependency exists for the second embodiment which will securely hold wire of any thickness not exceeding the diameter of its cylindrical passageways 45.

In applying lacing strips of either of the forms herein described it is customary, as before stated, to fasten the ends thereof to the framework of the spring cushion or the like to which it is desired to attach them and it is also necessary to impart a tension to the lacing strips that will counteract the downward pressure transmitted by the springs S. In order to accomplish the operation of fastening the strips under tension in an efficient manner I have found it convenient to use a tool such as shown in Figures 13 and 12 and the use of which is illustrated in Figure 11.

On referring to Figures 12 and 13 it will be noted that the tool is shown as comprising a handle portion 50 on which is mounted, in any suitable or preferred manner, as by screws 52, a head 54.

A pair of pins 56 are shown as mounted on an outwardly projecting portion 57 of the head 54 and these pins are further shown as extending in spaced parallel relation to the main body of the head 54. The spacing of the pins from each other and from the walls is shown as such that they are adapted to enter a pair of adjacent spring seating openings of the lacing strips of either of the types disclosed herein. To facilitate insertion of the pins 56 into these openings they may be tapered, as shown.

By inserting the pins 56 into the openings of a lacing strip as indicated in Figure 11 a firm hold may be obtained on the strip. After one end of the strip is fastened as by nails 60 to one side of the frame 62, it may be held in tensed relation as shown in Figure 11 so that nails may be driven into the other frame member 64. Thereafter the strip may be cut or broken by bending on a line with perforations at the proper length.

In using the tool it may be applied at any part of a lacing strip and not at or adjacent its end portion, as shown in Figure 11, so that it is not necessary to sever the portion utilized from the main body or roll (where the strip is furnished in rolls) of strip until it has been fastened in place.

It may be found desirable to apply a protective coat in the nature of padding to the tool, so that it will not scratch or otherwise injure the materials it comes in contact with.

While I have herein disclosed several illustrative embodiments of my invention and described the manner of their use, it will be understood that the same may be embodied in many other forms without departing from the spirit thereof, as will be obvious to those skilled in the art, and that the disclosure herein is merely by way of illustration and is not to be interpreted in a limiting sense, and that I do not limit myself other than as called for by the prior art.

Having thus described my invention and illustrated its use, what I claim as new and desire to secure by Letters Patent is:

1. For use in furniture for the support of coil springs, a lacing strip having at least one pair of transversely disposed ribs formed therein and defining a hollow between them and means in said hollow adapted to receive a portion of the spring, said means comprising sections of material raised from the walls of said hollow and contoured so as to form a cylindrical passageway having a restricted opening at one side through which a portion of a spring may be inserted when the passageway is enlarged by flexing the strip, but which will not permit the passage of the spring when the strip is normally contoured.

2. For use in furniture for the support of coil springs, a lacing strip having at least one pair of transversely disposed ribs formed therein and defining a hollow between them and means in said hollow adapted to receive a portion of the spring, said means comprising sections of material raised from the walls of said hollow and contoured so as to form a passageway having a restricted opening at one side through which a portion of a spring may be inserted when the passageway is enlarged by flexing the strip, but which will not permit the passage of the spring when the strip is normally contoured.

3. For use in furniture for the support of coil springs a lacing strip of resilient material having a covering of sound deadening material and having at least one pair of transversely disposed ribs formed therein and defining a hollow between them and means in said hollow adapted to receive a portion of the spring, said means comprising sections of material raised from the walls of said hollow and contoured so as to form a cylindrical passageway having a restricted opening at one side through which a portion of a spring may be inserted when the passageway is enlarged by flexing the strip, but which will not permit the passage of the spring when the strip is normally contoured.

4. A lacing strip for attachment to furniture for supporting furniture coil springs, transverse corrugations in said strip at relatively closely spaced intervals, whereby the strip is rendered readily stretchable, the corrugations having part of the material struck up from the body thereof so as to bridge the corrugations and to provide openings along the length of the strip to receive end portions of the spring sections and hold said ends between the corrugations and the struck up portions, whereby the springs can be associated with the strip without requiring any tools or any special handling, except for the aforementioned positional relationship and whereby the association can always be effected regardless of the varied diameter of the springs because of the close spacing of these transverse spaces, the yieldable character of the springs and the stretchability of the lacing strip.

5. A lacing strip for supporting furniture coil springs, said strip having transverse corrugations therein at relatively closely spaced intervals, and said corrugations being of a depth and a width so as to form valleys adapted to receive portions of a furniture spring therein, and means integral with said strip to cause departures of the width of each of said valleys at portions thereof from their basic contours, said means being constituted by deformations of portions of the walls of said valleys out of their basic regular contour, whereby portions of said valleys are wider than other portions.

6. A lacing strip for supporting furniture coil springs, said strip having transverse corrugations therein at relatively closely spaced intervals, and said corrugations being of a depth and a width adapted to receive portions of a furniture spring therein, and individual means integral with said strip and associated with each corrugation to resist movement of said spring portions out of said corrugations by movement away from said strip, said means being in the form of portions struck up out of the walls of the corrugations.

7. A lacing strip for supporting furniture coil springs having alternate transverse ribs and transverse valleys therein, the depth of the valleys being of the order of at least the diameter of the wire of which the coil spring is made and portions of the walls of each valley being struck up so as to form means to resist movement of a portion of a coil spring seated in the valley upwardly out of the valley.

8. A lacing strip for supporting furniture coil springs having alternate transverse ribs and transverse valleys therein, the depth of the valleys being of the order of at least the diameter of the wire of which the coil spring is made and portions of the walls of each valley being struck up so as to form means to prevent a portion of a coil spring seated in the valley from moving upwardly out of the valley, each of said portions being in the form of a bridge overlying portions of the valley and the uppermost parts of said bridge being situated at approximately the level of the tops of the adjacent ribs.

9. A support for a furniture coil spring comprising a pair of lacing strips crossing each other at an angle, each of said strips being corrugated transversely of its length, whereby a series of parallel transverse depressions are formed on each face of the strip, and means struck up out of the strip associated with each valley of a face, serving to retain a furniture spring coil portion positioned in said groove within said groove.

PAUL STADTLER.